United States Patent [19]

Bresser et al.

[11] Patent Number: 4,701,486

[45] Date of Patent: Oct. 20, 1987

[54] STABILIZER COMPOSITIONS FOR PVC RESINS

[75] Inventors: Robert E. Bresser, Sharonville; Karl R. Wursthorn, of Cincinnati, both of Ohio

[73] Assignee: Morton Thiokol, Inc., Chicago, Ill.

[21] Appl. No.: 568,532

[22] Filed: Jan. 5, 1984

Related U.S. Application Data

[63] Continuation of Ser. No. 382,822, May 27, 1982, abandoned, which is a continuation of Ser. No. 238,298, Feb. 26, 1981, abandoned.

[51] Int. Cl.$^4$ ............................................. C08K 5/58
[52] U.S. Cl. ................................. 524/182; 524/180; 524/181; 524/306; 524/311; 524/312; 524/314; 252/400.1
[58] Field of Search ............... 524/180, 181, 182, 333, 524/330, 303, 304, 392; 252/400 R, 404

[56] References Cited

U.S. PATENT DOCUMENTS

| | | | |
|---|---|---|---|
| 2,707,178 | 4/1955 | Wilson | 524/304 |
| 2,809,956 | 10/1957 | Mack et al. | 260/45.75 |
| 2,954,362 | 9/1960 | Wilson | 524/181 |
| 3,063,963 | 11/1962 | Wooten et al. | 524/180 |
| 3,067,166 | 12/1962 | Zaremsky | 260/45.75 |
| 3,103,500 | 9/1963 | Tholstrup et al. | 524/330 |
| 3,144,422 | 8/1964 | Homberg | 524/302 |
| 3,167,527 | 1/1965 | Hechenbleikner et al. | 524/180 |
| 3,242,133 | 3/1966 | Lindsey | 524/392 |
| 3,313,761 | 4/1967 | Barnes et al. | 260/31.8 |
| 3,413,264 | 11/1968 | Hechenbleikner et al. | 524/180 |
| 3,417,039 | 12/1968 | Penneck | 260/23 |
| 3,442,806 | 5/1969 | O'Neill | 252/46.4 |
| 3,483,159 | 12/1969 | Kauder | 260/45.75 |
| 3,503,924 | 3/1970 | Pollock | 524/180 |
| 3,507,827 | 4/1970 | Pollock | 524/180 |
| 3,534,121 | 10/1970 | Eggensperger | 260/880 |
| 3,542,825 | 11/1970 | Hoye | 260/429.7 |
| 3,553,163 | 1/1971 | Spacht | 260/45.95 |
| 3,565,931 | 2/1971 | Brecker | 260/429.7 |
| 3,640,950 | 2/1972 | Weisfeld | 260/45.75 K |
| 3,674,737 | 7/1972 | Brecker et al. | 260/45.75 K |
| 3,715,333 | 2/1973 | Larkin | 260/45.75 R |
| 3,758,341 | 9/1973 | Wowk | 260/429.7 |
| 3,758,536 | 9/1973 | Wowk | 260/429.7 |
| 3,758,537 | 9/1973 | Wowk | 260/429.7 |
| 3,810,868 | 5/1974 | Weisfeld | 260/45.75 K |
| 3,822,233 | 7/1974 | Stapfer | 260/45.75 K |
| 3,875,084 | 4/1975 | Weil | 260/2 EC |
| 3,887,519 | 6/1975 | Weisfeld et al. | 260/45.75 K |
| 3,890,277 | 6/1975 | Kugele et al. | 524/180 |
| 3,894,989 | 7/1975 | Collins | 260/45.75 S |
| 3,928,285 | 12/1975 | Gough | 524/181 |
| 3,933,680 | 1/1976 | Wowk | 252/406 |
| 3,943,099 | 3/1976 | Bakassian et al. | 260/45.75 E |
| 3,970,678 | 7/1976 | Molt | 260/429.7 |
| 3,972,908 | 8/1976 | Collins | 260/429.7 |
| 3,979,359 | 9/1976 | Kugele et al. | 260/45.75 S |
| 4,029,618 | 6/1977 | Dieckmann | 260/23 X |
| 4,062,881 | 12/1977 | Kugele | 524/181 |
| 4,098,763 | 7/1978 | Starnes | 260/45.7 S |
| 4,111,903 | 9/1978 | Hoch et al. | 524/180 |
| 4,118,371 | 10/1978 | Kugele | 524/181 |
| 4,122,064 | 10/1978 | Scheidl et al. | 260/45.75 S |
| 4,128,530 | 12/1978 | Cottman | 260/45.95 C |
| 4,254,017 | 3/1981 | Dworkin et al. | 524/180 |
| 4,255,320 | 3/1981 | Brecker et al. | 260/45.75 |
| 4,256,618 | 3/1981 | Brecker et al. | 260/23 |
| 4,274,999 | 6/1981 | Burley et al. | 260/45.75 S |
| 4,290,942 | 9/1981 | Schneider et al. | 524/392 |
| 4,314,934 | 2/1982 | Smith et al. | 524/330 |
| 4,315,850 | 2/1982 | Kugele | 524/180 |
| 4,360,319 | 11/1982 | Kugele et al. | 524/181 |

FOREIGN PATENT DOCUMENTS

| | | |
|---|---|---|
| 0018045 | 10/1980 | European Pat. Off. |
| 2316280 | 1/1977 | France |
| 2333017 | 6/1977 | France |
| 2434835 | 3/1980 | France |
| 16435 | 10/1962 | Japan |
| 18213 | 5/1972 | Japan |
| 52-38556 | 3/1977 | Japan |
| 55-31900 | 3/1980 | Japan |
| 55-160044 | 12/1980 | Japan |
| 2286 | 1/1981 | Japan |
| 56-844 | 1/1981 | Japan |
| 56-002336 | 1/1981 | Japan |
| 771857 | 4/1957 | United Kingdom |
| 827393 | 2/1960 | United Kingdom |
| 874574 | 8/1961 | United Kingdom |
| 991763 | 5/1965 | United Kingdom |
| 1001344 | 8/1965 | United Kingdom |
| 1117652 | 6/1968 | United Kingdom |
| 1349913 | 9/1971 | United Kingdom |
| 1321157 | 6/1973 | United Kingdom |
| 1502073 | 2/1978 | United Kingdom |

OTHER PUBLICATIONS

Klemchuck, "Pol(vinyl chloride) Stabilization Mechanisms," ACS Advances in Chemistry Series, 85,1, 1968.
Starnes, et al, "Chemical Stabilization of Poly(vinyl chloride) by Prior Reaction with Di(n-butyl)tin bis(n-dodecyl mercaptide)," Macromolecules, vol. 9, No. 4, p. 633 (Jul.-Aug. 1976).
Parker et al., "The Ligand Exchange Reaction of Some Dialkyltin Dimercaptides and Dicarboxylates with Dialkyltin Dichlorides," Acs Advances in Chemistry Series, 169, 363-373 (1978).

List continued on next page.

Primary Examiner—Veronica P. Hoke
Attorney, Agent, or Firm—Richard J. Sheridan; Gerald K. White

[57] ABSTRACT

Compositions which are effective in stabilizing polymers against the deteriorative effects of heat are provided comprising (1) a mono-organotin compound or mixture of mono-organotin compounds, (2) a mercaptan-containing organic compound or mixture of mercaptan-containing organic compounds, and, optionally (3) a diorganotin compound or mixture of diorganotin compounds. Also provided are polymer compositions containing said stabilizers and articles of manufacture made from said stabilized polymer compositions.

53 Claims, No Drawings

OTHER PUBLICATIONS

Wirth et al, The effect of Organotin Chlorides on the Thermal Stability of PVC," Journal of Vinyl Technology, vol. 1, No. 1, pp. 51-54 (Mar. 1979).

Bellinger et al, "Stabilization of Poly(vinyl chloride) by Dibutyltin Thioglycolate—Part 1: Structure and Composition Changes which Occur During Processing".

Burley et al, "A Possible Mechanism to Explain the Synergistic Effects Exhibited by Mixtures of Alkyltin Mercaptoesters as Stabilizers for PVC," Polymer Degradation and Stability 3, pp. 285-294 (1980-81).

Fernand Chevassus and Roger Brontelles: The Stabilization of Polyvinyl Chloride (1963) pp. 56-73, St. Martin's Press, N.Y.

Christian Stapfer et al, "Antioxidative Stabilization of Polyvinyl Chloride", Polymer Preprints, American Chemical Society, Polymer Chemistry Division, Mar. 1971, vol. 12, No. 1, pp. 795-802.

4,701,486

STABILIZER COMPOSITIONS FOR PVC RESINS

This application is a continuation of application Ser. No. 382,822, filed May 27, 1982 now abandoned which is in turn a continuation of application Ser. No. 238,298 filed Feb. 26, 1981 now abandoned.

FIELD OF THE INVENTION

This invention relates to stabilizer compositions containing (1) a mono-organotin compound or mixture of mono-organotin compounds, (2) a mercaptan-containing organic compound or mixture of mercaptan-containing organic compounds, and, optionally (3) a diorganotin compound or mixture of diorganotin compounds. This invention also relates to polymer compositions containing (1) a polymer normally susceptible to heat induced deterioration, (2) a mono-organotin compound or mixture of mono-organotin compounds, (3) a mercaptan-containing organic compound or mixture of mercaptan-containing organic compounds, and, optionally, (4) a diorganotin compound or mixture of diorganotin compounds. This invention further relates to articles of manufacture, e.g. pipe, made from stabilized polymer compositions comprising (1) a polymer normally susceptible to heat induced deterioration, (2) a mono-organotin compound or mixture of mono-organotin compounds, (3) a mercaptan-containing organic compound or mixture of mercaptan containing organic compounds, and, optionally, (4) a diorganotin compound or mixture of diorganotin compounds.

BACKGROUND OF THE INVENTION

Organotin compounds, particularly useful as stabilizers for halogen containing polymers, are well-known in the art. These organotin compounds can provide stabilization of such polymers when used alone or in combination with various compounds. For example, U.S. Pat. No. 3,503,924 to M. W. Pollock discloses stabilizers for polyvinyl chloride resins which are mixtures containing a diorganotin mercaptide and a minor amount of an alpha-mercapto acid. Pollock also discloses, in U.S. Pat. No. 3,507,827, stabilizer combinations for decreasing early discoloration of polyvinyl chloride resins which contain (1) a dialkyl, dicycloalkyl or alkylcycloalkyl tin mercapto carboxylic acid ester, and (2) an alpha- or beta-mercapto acid having at least three carbon atoms, or an alpha- or beta-mercapto alcohol having at least two carbon atoms.

SUMMARY OF THE INVENTION

In accordance with this invention there are provided compositions for stabilizing halogen-containing organic polymers which comprise (1) a mono-organotin compound or mixture of mono-organotin compounds, (2) a mercaptan-containing organic compound or mixture of mercaptan-containing organic compounds, and, optionally, (3) a diorganotin compound or mixture of diorganotin compounds. This invention is also directed to polymer compositions comprising (1) a polymer normally susceptible to heat induced deterioration, (2) a mono-organotin compound or mixture of mono-organotin compounds, (3) a mercaptan-containing organic compound or mixture of mercaptan-containing organic compounds, and, optionally, (4) a diorganotin compound or mixture of diorganotin compounds. Additionally, this invention is directed to articles of manufacture, e.g. pipe, made from stabilized polymer compositions comprising (1) a polymer normally susceptible to heat induced deterioration, (2) a mono-organotin commpound or mixture of mono-organotin compounds, (3) a mercaptan-containing organic compound or mixture of mercaptan-containing organic compounds, and, optionally, (4) a diorganotin compound or mixture of diorganotin compounds.

DETAILED DESCRIPTION

The stabilizer compositions of this invention have quite unexpectedly been found to impart stabilization against the deteriorative effects of heat to halogen-containing organic polymers which is superior to those stabilizer compositions previously known in the art.

The term halogen-containing organic polymers as used herein refers to halogen-containing vinyl and vinylidene polymers or resins in which the halogen is attached directly to the carbon atoms. Preferably, the polymer is a vinyl halide polymer, more particularly a vinyl chloride polymer. Usually, the vinyl chloride polymer is made from monomers consisting of vinyl chloride alone or a mixture of monomers comprising, preferably, at least about 70% by weight based on the total monomer weight of vinyl chloride.

The halogen-containing polymers which can be stabilized according to this invention include chlorinated polyethylene having 14 to 75%, e.g. 27%, chloride by weight, chlorinated natural and synthetic rubber, rubber hydrochloride, chlorinated polystyrene, chlorinated polyvinyl chloride, polyvinyl bromide, polyvinyl fluoride, copolymers of vinyl chloride with 1 to 90%, preferably 1 to 30%, of a copolymerizable ethylenically unsaturated material such as, for example, vinyl acetate, vinyl butyrate, vinyl benzoate, vinylidene chloride, diethyl fumarate, diethyl maleate, other alkyl fumarates and maleates, vinyl propionate, methyl acrylate, 2-ethylhexyl acrylate, butyl acrylate and other alkyl acrylates, methyl methacrylate, ethyl methacrylate, butyl methacrylate and other alkyl methacrylates, methyl alpha-chloroacrylate, styrene, trichloroethylene, vinyl ethers such as vinyl ethyl ether, vinyl chloroethyl ether and vinyl phenyl ether, vinyl ketones such as vinyl methyl ketone and vinyl phenyl ketone, 1-fluoro-2-chloroethylene, acrylonitrile, chloroacrylonitrile, allylidene diacetate and chloroallylidene diacetate. Typical copolymers include vinyl chloride-vinyl acetate (96:4 sold commercially as VYNW), vinyl chloride-vinyl acetate (87:13), vinyl chloride-vinyl acetate-maleic anhydride (86:13:1), vinyl chloride-vinylidene chloride (95:5); vinyl chloride-diethyl fumarate (95:5), and vinyl chloride-2-ethylhexyl acrylate (80:20). In addition to the stabilizer compositions of this invention, there can also be incorporated into the halogen-containing organic polymer conventional additives such as plasticizers, pigments, fillers, dyes, ultraviolet light absorbing agents, densifying agents and the like.

The stabilizer compositions useful in the practice of this invention comprise (1) a mono-organotin compound or mixture of mono-organotin compounds, (2) a mercaptan-containing organic compound or mixture of mercaptan-containing organic compounds, and, optionally, (3) a diorganotin compound or mixture of diorganic compounds. The mono-organotin compounds useful in this invention contain one or more tetravalent tin atoms which each have one direct tin to carbon bond and have structures selected from the following formulas:

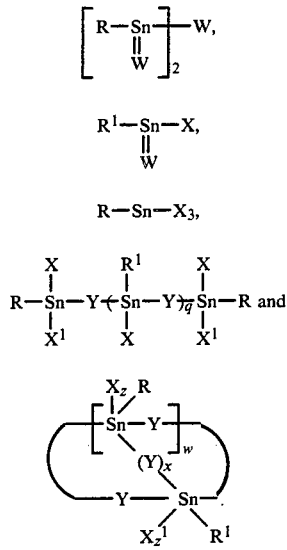

wherein
X and X' are the same or different and are selected from
—SR$^2$,

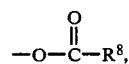

and O—R$^8$ with the proviso that in formula (V) when z=1 and in formulas (III) and (IV) at least one X or X$^1$ is —SR$^2$;

Y is

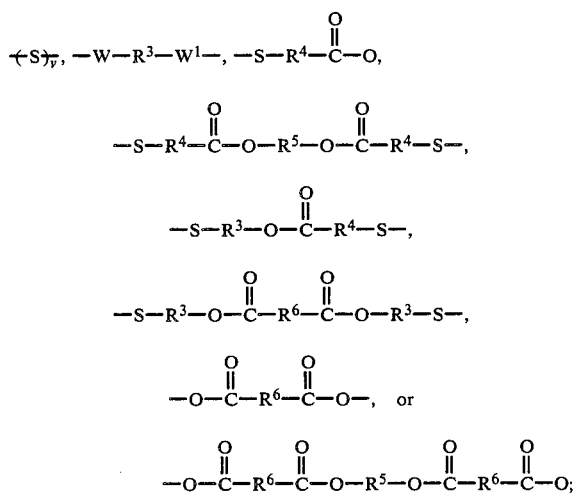

W and W$^1$ are the same or different and are oxygen or sulfur;

R and R$^1$ are the same or different and are selected from alkyl, aryl, alkenyl, aralkyl, alkaryl, cycloalkyl, cycloalkenyl,

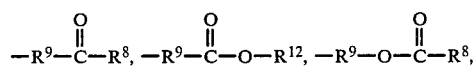

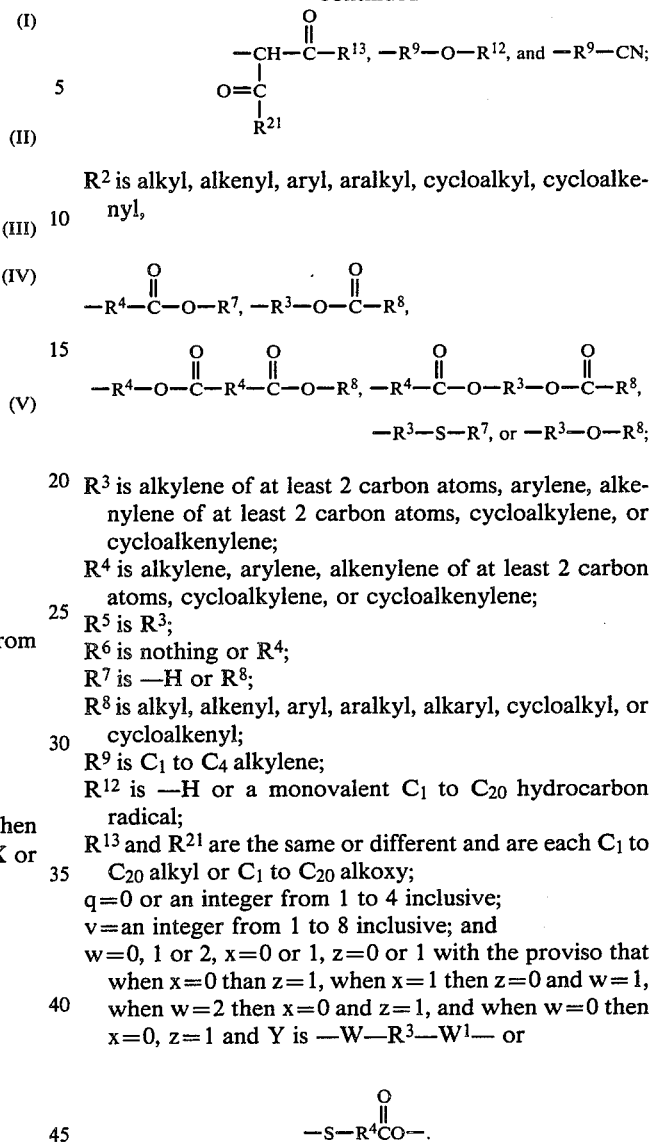

R$^2$ is alkyl, alkenyl, aryl, aralkyl, cycloalkyl, cycloalkenyl,

R$^3$ is alkylene of at least 2 carbon atoms, arylene, alkenylene of at least 2 carbon atoms, cycloalkylene, or cycloalkenylene;

R$^4$ is alkylene, arylene, alkenylene of at least 2 carbon atoms, cycloalkylene, or cycloalkenylene;

R$^5$ is R$^3$;

R$^6$ is nothing or R$^4$;

R$^7$ is —H or R$^8$;

R$^8$ is alkyl, alkenyl, aryl, aralkyl, alkaryl, cycloalkyl, or cycloalkenyl;

R$^9$ is C$_1$ to C$_4$ alkylene;

R$^{12}$ is —H or a monovalent C$_1$ to C$_{20}$ hydrocarbon radical;

R$^{13}$ and R$^{21}$ are the same or different and are each C$_1$ to C$_{20}$ alkyl or C$_1$ to C$_{20}$ alkoxy;

q=0 or an integer from 1 to 4 inclusive;

v=an integer from 1 to 8 inclusive; and w=0, 1 or 2, x=0 or 1, z=0 or 1 with the proviso that when x=0 than z=1, when x=1 then z=0 and w=1, when w=2 then x=0 and z=1, and when w=0 then x=0, z=1 and Y is —W—R$^3$—W$^1$— or $$-S-R^4CO-.$$

As used herein the term alkyl represents monovalent straight or branched chain hydrocarbon radicals containing, for example, 1 to 20 carbon atoms. The term aryl refers to monovalent C$_6$–C$_{10}$ aromatic rings such as benzene and naphthalene. The term alkenyl refers to monovalent straight or branched chain C$_2$ to C$_{20}$ hydrocarbon radicals containing at least one double bond. The term aralkyl represents a monovalent C$_1$ to C$_{20}$ hydrocarbon radical having attached thereto an aryl radical. The term alkaryl refers to monovalent aryl radicals having attached thereto at least one C$_1$–C$_{20}$ alkyl group. The term cycloalkyl represents monovalent C$_3$–C$_8$ saturated cycloaliphatic radicals, and the term cycloalkenyl represents C$_5$–C$_8$ cycloaliphatic radicals containing at least one double bond.

The preferred mono-organotin compounds useful in this invention are those compounds according to formula (I) where R is methyl, butyl or octyl and W is sulfur; those compounds according to formula (II) where R$^1$ is methyl or butyl, W is sulfur, X is —SR$^2$ where R$^2$ is

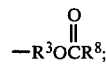

those compounds according to formula (III) where R is methyl or butyl, X is —SR$^2$ where R$^2$ is

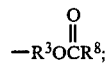

those compounds according to formula (IV) where R is methyl, X is —SR$^2$ where R$^2$ is

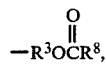

R$^1$ is methyl, X$^1$ is —SR$^2$ where R$^2$ is

—R$^3$OCR$^8$,

Y is —S—, and q=0; and those compounds according to formula (V) where R is methyl, X is —SR$^2$ where R$^2$ is

—R$^3$OCR$^8$,

R$^1$ is methyl, X$^1$ is —SR$^2$ where R$^2$ is

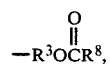

Y is —S—, W=1, x=0, and z=1.

Examples of mono-organotin compounds which are useful in this invention include, but are not limited to, those illustrated in Tables I-IV below. Thus, representative of the mono-organotin compounds described by formulas (I) and (II) are those illustrated in Table I below.

Examples of the mono-organotin compounds represented by formula (III) are illustrated in Table II below.

The mono-organotin compounds illustrated in Table III below are representative of compounds described in formula (IV).

The mono-organotin compound illustrated in Table IV below is representative of compounds described by formula (V).

TABLE I

| | | | | |
|---|---|---|---|---|
| (I) | $\left[\begin{array}{c}R-Sn\\ \parallel\\ W\end{array}\right]_2$—W, | (II) | $R^1$—Sn—X<br>$\parallel$<br>W | |

| Mono-organotin Compound No. | R | R$^1$ | W | X |
|---|---|---|---|---|
| 1 | —C$_4$H$_9$ | — | S | — |
| 2 | —C$_8$H$_{17}$ | — | O | — |
| 3 | — | —CH$_3$ | S | —SCH$_2$CH$_2$OCC$_{17}$H$_{33}$ (O) |
| 4 | — | —CH$_3$ | S | —SCH$_2$COC$_8$H$_{17}$ (O) |
| 5 | — | —CH$_2$CH$_2$COC$_4$H$_9$ (O) | S | —SCH$_2$CH$_2$COC$_{18}$H$_{37}$ (O) |

TABLE II

| | R—Sn—X$_3$ | (III) |
|---|---|---|
| Mono-organotin Compound No. | R | X |
| 6 | —CH$_3$ | —SCH$_2$COC$_8$H$_{17}$ (O) |
| 7 | —C$_4$H$_9$ | —SCH$_2$CH$_2$OCC$_7$H$_{15}$ (O) |

TABLE III

| Mono-organotin Compound No. | R and R$^1$ | X | X$^1$ | Y | q |
|---|---|---|---|---|---|
| 8 | —CH$_3$ | —SCH$_2$CH$_2$OCC$_{11}$H$_{23}$ (O) | Same as X | —S— | 0 |
| 9 | —CH$_2$CH$_2$COC$_4$H$_9$ (O) | —SCH$_2$CH$_2$COC$_8$H$_{17}$ (O) | Same as X | —S—S— | 0 |

TABLE III-continued

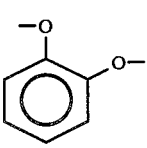

| Mono-organotin Compound No. | R and $R^1$ | X | $X^1$ | Y | q |
|---|---|---|---|---|---|
| 10 | —CH$_3$ | —SCH$_2$CH$_2$OC(O)C$_{17}$H$_{33}$ | Same as X | —SCH$_2$C(O)C$_4$H$_8$OC(O)CH$_2$S— | 1 |
| 11 | —CH$_3$ | —SCH$_2$CH$_2$OC(O)CH=CHC(O)OCH$_3$ | Same as X | —S— | 0 |
| 12 | —C$_4$H$_9$ | —SCH$_2$CH$_2$OC(O)C$_8$H$_{17}$ | Same as X | —S—CH$_2$C(O)— | 0 |
| 13 | —CH$_3$ | —SCH$_2$CH$_2$OC(O)C$_{11}$H$_{23}$ | Same as X | —S— | 0 |
| 14 | —C$_4$H$_9$ | —SCH$_2$CH$_2$OC(O)C$_7$H$_{15}$ | Same as X | catechol-O,O— | 0 |

TABLE IV

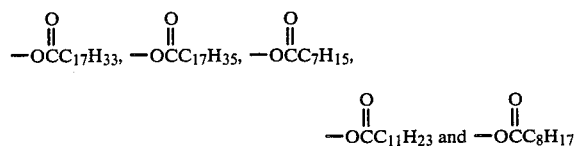

| Mono-organotin Compound No. | R and $R^1$ | X and $X^1$ | Y | w | x | z |
|---|---|---|---|---|---|---|
| 15 | —CH$_3$ | —SCH$_2$CH$_2$OC(O)C$_{17}$H$_{33}$ | —S— | 1 | 0 | 1 |

As used in Tables I–III above, and throughout this specification, the radicals —C$_4$H$_9$, —C$_8$H$_{17}$, —C$_{12}$H$_{25}$, —C$_9$H$_{19}$ and —C$_{10}$H$_{21}$ represent n-butyl, n-octyl, n-dodecyl, n-nonyl and n-decyl respectively.

The carboxyl radicals

—OC(O)C$_{17}$H$_{33}$, —OC(O)C$_{17}$H$_{35}$, —OC(O)C$_7$H$_{15}$,

—OC(O)C$_{11}$H$_{23}$ and —OC(O)C$_8$H$_{17}$ are derived from oleic acid, stearic acid, n-octanoic acid, lauric acid, and pelargonic acid respectively. Likewise, the radicals —OC$_{13}$H$_{27}$, —OC$_{18}$H$_{37}$, and —OC$_8$H$_{17}$ are derived from tridecanol, stearyl alcohol and iso-octanol respectively.

The mercaptan-containing organic compounds useful in this invention include hydrocarbyl mercaptans, mercapto esters, mercapto alcohols, and mercapto acids. These mercaptan-containing organic compounds have structures illustrated by the following formulas:

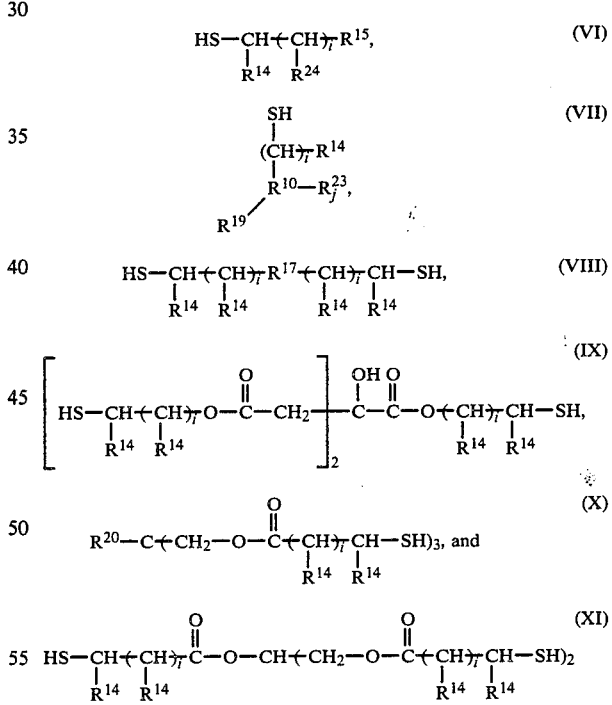

$R^{10}$ is cycloalkyl, cycloalkenyl or phenyl;
$R^{14}$ is —H, aryl, or $C_1$ to $C_{18}$ alkyl;
$R^{15}$ and $R^{24}$ are the same or different and are

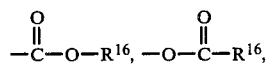

—OH, —SH, aryl, $C_1$ to $C_{18}$ alkyl, or —H;
$R^{16}$ is —H, or $R^8$;
$R^{17}$ is

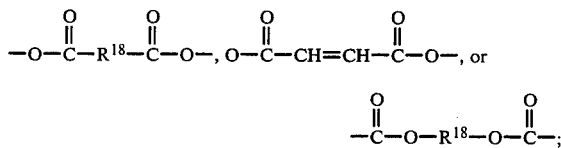

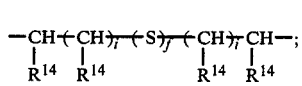

$R^{18}$ is arylene, $C_1$ to $C_8$ alkylene, or

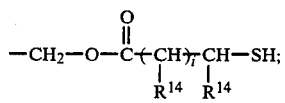

$R^{19}$ is —H or a divalent group which may contain halogen, hydroxy, mercapto or alkyl substituents and which when $R^{10}$ is phenyl combines with the phenyl to form a naphthalene ring;

$R^{20}$ is —$CH_3$, —$CH_2CH_3$, or

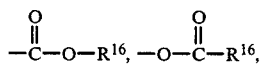

$R^{23}$ is

—SH, aryl, $C_1$ to $C_{18}$ alkyl, —OH or —H with the proviso that in formula (VII) when $R^{10}$ is phenyl, $R^{23}$ is —OH and i=0, then the —OH and —SH groups are on non-adjacent carbon atoms;

i=0 or in integer from 1 to 6 inclusive;

j=0, 1, 2 or 3; and f=1 or 2.

The mercaptan-containing organic compounds useful in this invention are well-known compounds (see, for example, U.S. Pat. Nos. 3,503,924 and 3,507,827).

The preferred mercaptan-containing organic compounds useful in this invention are those compounds according to formula (VI) where $R^{14}$ is —H, $R^{24}$ is —H, $R^{15}$ is

and i=1; those compounds according to formula (VII) where $R^{10}$ is phenyl, $R^{14}$ is —H, $R^{23}$ is —H, $R^{19}$ is —H, i=1 and j=1; those compounds according to formula (VIII) where $R^{14}$ is —H, $R^{17}$ is

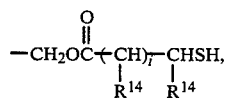

and i=1; those compounds according to formula (IX) where $R^{14}$ is —H and i=1; those compounds according to formula (X) where $R^{20}$ is —$C_2H_5$ or

$R^{14}$ is —H and i=1; and those compounds according to formula (XI) where $R^{14}$ is —H and i=1.

Examples of the mercaptan-containing organic compounds described by formula (VI) include, but are not limited to, the following compounds:

$HSC_{12}H_{25}$

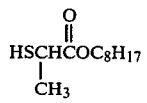

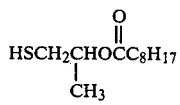

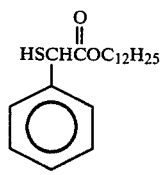

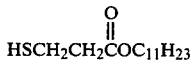

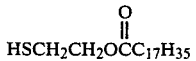

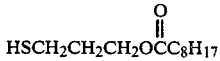

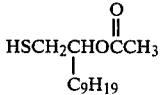

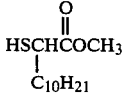

$HSCH_2CH_2OH$ $HSCH_2CH_2CH_2OH$

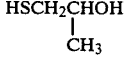

-continued

HSCH$_2$CHOH
|
C$_9$H$_{19}$

HSCH$_2$COH
‖
O

HSCH$_2$CH$_2$COH
‖
O

HSCHCOH
‖
O
|
C$_{10}$H$_{21}$

Examples of the mercaptan-containing organic compounds described by formula (VII) include, but are not limited to, the following compounds:

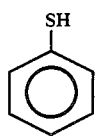

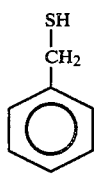

Examples of mercaptan-containing organic compounds represented by formula (VIII) include, but are not limited to, the following compounds:

HSCH$_2$COCH$_2$CH$_2$OCCH$_2$SH
‖            ‖
O            O

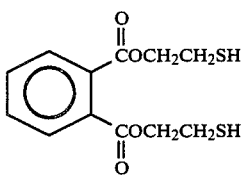

HSCH$_2$CH$_2$OC(CH$_2$)$_4$COCH$_2$CH$_2$SH
‖                   ‖
O                   O

HSCH$_2$CH$_2$OCCH=CHCOCH$_2$CH$_2$SH
‖                ‖
O                O

HSCH$_2$CH$_2$OCCH$_2$CH$_2$COCH$_2$CH$_2$SH
‖              ‖
O              O

An example of the mercaptan-containing organic compounds described by formula (IX) includes, but is not limited to, the following:

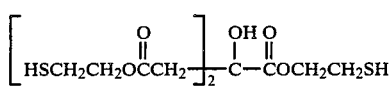

The mercaptan-containing organic compounds represented by formula (X) are exemplified by, but are not limited to, the following:

CH$_3$CH$_2$C(CH$_2$OCCH$_2$SH)$_3$
‖
O

The mercaptan-containing organic compounds represented by formula (XI) are exemplified by, but are not limited to, the following:

HSCH$_2$CH$_2$COCH(CH$_2$OCCH$_2$CH$_2$SH)$_2$
‖          ‖
O          O

HSCH$_2$COCH(CH$_2$OCCH$_2$SH)$_2$
‖         ‖
O         O

The diorganotin compounds useful in the practice of this invention contain one or more tetravalent tin atoms, at least one of which has direct bonds to two carbon atoms and have structures selected from the following formulas:

$$R^1-\underset{\underset{W}{\|}}{Sn}-R, \qquad (XII)$$

$$R-\underset{\underset{R^1}{|}}{\overset{\overset{X^1}{|}}{Sn}}-X, \qquad (XIII)$$

$$R\text{\textendash}\underset{\underset{X}{|}}{\overset{\overset{R^1}{|}}{Sn}}\text{\textendash}Y\underset{m}{\text{\textendash}}\underset{\underset{X_n^1}{|}}{\overset{\overset{R_p}{|}}{Sn}}\text{\textendash}R^1, \text{ and} \qquad (XIV)$$

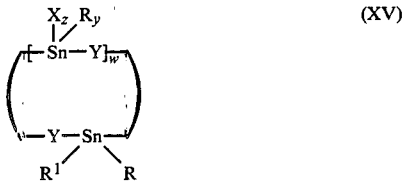     (XV)

wherein
R, R$^1$, W, X, X$^1$, Y, w and z are as previously defined; n=0, 1 or 2, p=0, 1 or 2 with proviso that n+p=2, and m=1 to 5;
y=1 or 2, y=2 with the proviso that when w=0 then Y is —W—R$^3$—W$^1$—, or $$-SR^4\overset{O}{\overset{\|}{C}}O-;$$

and in formula (XV) when z=1 and in formulas (XIII) and (XIV) at least one X or X$^1$ is —SR$^2$.

The mono-organotin compounds and diorganotin compounds useful in this invention may be prepared by methods well-known in the art. See, for example, U.S. Pat. Nos. 3,565,930, 3,869,487, 3,979,359, 4,118,371, 4,134,878 and 4,183,846.

The preferred diorganotin compounds used in the practice of this invention are those compounds according to formula (XII) where R is methyl or butyl, R$^1$ is methyl or butyl and W is sulfur; those compounds according to formula (XIII) where R is methyl or butyl, $R^1$ is methyl or butyl, X is $-SR^2$ where $R^2$ is

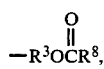

and $X^1$ is $-SR^2$ where $R^2$ is

those compounds according to formula (XIV) where R is methyl or butyl, $R^1$ is methyl or butyl, Y is $-S-$, X is $-SR^2$ where $R^2$ is

$X^1$ is $-SR^2$ where $R^2$ is

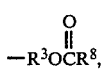

m=1, n=2 and p=0; and those compounds according to formula (XV) where R is methyl or butyl, $R^1$ is methyl or butyl, X is $-SR^2$ where $R^2$ is

Y is $-S-$, w=1, y=1 and z=1.

Examples of diorganotin compounds according to formula (XII) include, but are not limited to, the compounds illustrated in Table V below.

TABLE V $$R^1-\underset{\underset{W}{\|}}{Sn}-R, \quad (XII)$$

| Diorganotin Compound | R | $R^1$ | W |
|---|---|---|---|
| A | $-C_4H_9$ | $-C_4H_9$ | S |
| B | $-C_8H_{17}$ | $-C_8H_{17}$ | O |

Examples of diorganotin compounds according to formula (XIII) include, but are not limited to, the compounds in Table VI below.

TABLE VI $$\begin{array}{c} X^1 \\ | \\ R-Sn-X \\ | \\ R^1 \end{array} \quad (XIII)$$

| Diorganotin Compound | R | $R^1$ | X and $X^1$ |
|---|---|---|---|
| C | $-CH_2CH_2\overset{O}{\underset{\|}{C}}OC_4H_9$ | Same as R | $-SCH_2CH_2O\overset{O}{\underset{\|}{C}}CH_3$ |
| D | $-CH_3$ | Same as R | $-SCH_2CH_2O\overset{O}{\underset{\|}{C}}C_{17}H_{35}$ |

Examples of diorganotin compounds according to formula (XIV) include, but are not limited to, the compounds in Table VII below.

TABLE VII $$\begin{array}{cc} R^1 & R_p \\ | & | \\ R+Sn-Y)_m Sn-R^1 \\ | & | \\ X & X_n^1 \end{array} \quad (XIV)$$

| Diorganotin Compound | R and $R^1$ | X | $X^1$ | Y | n | p | m |
|---|---|---|---|---|---|---|---|
| E | $-CH_3$ | $-SCH_2\overset{O}{\underset{\|}{C}}OC_{13}H_{27}$ | Same as X | $-S-$ | 1 | 1 | 1 |
| F | $-C_4H_9$ | $-SCH_2CH_2O\overset{O}{\underset{\|}{C}}OC_8H_{17}$ | Same as X | $-S-$ | 1 | 1 | 1 |

Examples of diorganotin compounds according to formula (XV) include, but are not limited to, the compounds in Table VIII below.

TABLE VIII $$\begin{array}{c} X_z \quad R_y \\ \diagdown \diagup \\ (\text{Sn} \quad y)_w \\ | \quad \quad | \\ Y \quad Sn \\ \diagup \diagdown \\ R^1 \quad R \end{array} \quad (XV)$$

| Diorganotin Compound | R | $R^1$ | X | Y | w | y | z |
|---|---|---|---|---|---|---|---|
| G | $-C_4H_9$ | $-C_4H_9$ | $-SCH_2CH_2\overset{O}{\underset{\|}{C}}OC_8H_{17}$ | $-S-$ | 1 | 1 | 1 |

The stabilizer compositions of this invention may be prepared by blending the components thereof in any convenient manner which produces a homogeneous mixture, such as by shaking or stirring in a container. Likewise, the stabilized compositions of this invention can be incorporated into the halogen-containing organic polymer by admixing the stabilizer composition and polymer, such as, for example, in an appropriate mill or mixer or by any other of the well-known methods which provide uniform distribution of the stabilizer throughout the polymer.

As previously stated, the stabilizer compositions of the present invention comprise (1) a mono-organotin compound or mixture of mono-organotin compounds, (2) a mercaptan-containing organic compound or mixture of mercaptan-containing compounds, and, optionally, (3) a diorganotin compound or mixture of diorganotin compounds. More particularly, the stabilizer compositions of this invention comprise from about 10% to about 60% by weight, preferably about 20% to about 40% by weight mercaptan-containing organic compound or mixture of mercaptan-containing organic compounds, based on the total weight of the stabilizer composition, the balance of the stabilizer composition comprising a mono-organotin compound or mixture of mono-organotin compounds, and, optionally, a diorganotin compound or mixture of diorganotin compounds. Thus, when no diorganotin compound or mixture of diorganotin compounds is employed in the practice of this invention, the mono-organotin compound or mixture of mono-organotin compounds will comprise from about 40% to about 90% by weight, preferably about 60% to about 80% by weight of the total weight of the stabilizer composition. When it is desirable to utilize a diorganotin compound or mixture of diorganotin compounds in the practice of this invention, said diorganotin compound or mixture of diorganotin compounds may comprise from about 0.05% to about 75%, by weight, preferably from about 0.05% to about 35% by weight of the total weight of the stabilizer composition.

The stabilizer compositions of this invention are employed in an amount sufficient to impart the desired resistance to heat deterioration to halogen-containing organic polymers. It will be readily apparent to one of ordinary skill in the art, that the precise amount of stabilizer composition used will depend upon several factors, including, but not limited to, the particular halogen-containing organic polymer employed, the temperature to which the polymer will be subjected, and the possible presence of other stabilizing compounds. In general, the more severe the conditions to which the halogen-containing organic polyerm is subjected, and the longer the term required for resisting degradation, the greater will be the amount of stabilizer composition required. Generally, as little as about 0.40 parts by weight of the stabilizer composition per hundred parts by weight of halogen-containing organic polymer will be effective. While there is no critical upper limit to the amount of stabilizer composition which can be employed, amounts in excess of about 10 parts by weight of stabilizer composition per hundred parts by weight of halogen-containing organic polymer do not give an increase in effectiveness commensurate with the additional amount of stabilizer employed.

The articles of manufacture contemplated by this invention are produced from the stabilized polymer compositions according to this invention. These articles of manufacture, e.g. pipe, may be formed from said stabilized polymer compositions by any of the well-known, conventional techniques for forming polymers into shaped articles of manufacture.

The following examples illustrate this invention. Unless otherwise indicated, all parts and percentages in the examples and throughout this specification are by weight.

EXAMPLES 1-4

Several mixtures are prepared by dry blending to 110° C. in a Henschel high intensity mixer (Model 2JSS) 100.0 parts of polyvinyl chloride (Geon 103EP-F-76 available commercially from B. F. Goodrich Chemical Company) with 3.0 parts of fine particle size calcium carbonate coated with calcium stearate, 1.0 part titanium dioxide, 1.2 parts paraffin wax (ADVAWAX® 165 paraffin wax available commercially from Carstab Corporation), 0.60 part calcium stearate, 0.15 part of an oxidized low molecular weight ethylene homopolymer (AC629A available commercially from Allied Chemical Corporation), and each in turn of the stabilizer compositions listed in Table A in the amounts indicated in Table A, said amounts being parts by weight of stabilizer per hundred parts polyvinyl chloride. The resulting mixture is masticated on a two-roll mill at about 193° C. Samples are taken at one minute intervals beginning after the first introduction of the mix to the mill.

The appearance of each sample taken from the mill is evaluated using the following scale:

10  9  8  7    6        5           4  3  2    1  0
White ———→ Tan-Orange ———→ Burn The results of these tests are indicated in Table A.

TABLE A

| Example No. | Stabilizer Composition | Parts By Weight | 1 | 2 | 3 | 4 | 5 | 6 | 7 | 8 | 9 | 10 |
|---|---|---|---|---|---|---|---|---|---|---|---|---|
| | | | | | | COLOR | | | | | | |
| 1 | Mono-organotin Cmpd. NO. 3 from Table I | 0.40 | 10 | 9 | 8 | 7+ | 6 | 5 | 4 | 2 | 1 | 1 |
| | $HSCH_2CH_2\overset{O}{\overset{\|}{C}}OC_8H_{17}$ | 0.08 | | | | | | | | | | |
| 2 | Mono-organotin Cmpd. No. 7 from Table II | 0.40 | 10+ | 10+ | 9 | 9 | 8 | 8 | 7 | 6 | 4 | 2 |
| | $HSCH_2CH_2O\overset{O}{\overset{\|}{C}}C_{17}H_{33}$ | 0.20 | | | | | | | | | | |
| 3 | Mono-organotin Cmpd. No. 8 from Table III | 0.35 | 10+ | 10+ | 9 | 8+ | 8 | 7 | 6 | 5 | 3 | 2 |

TABLE A-continued

| Example No. | Stabilizer Composition | Parts By Weight | 1 | 2 | 3 | 4 | 5 | 6 | 7 | 8 | 9 | 10 |
|---|---|---|---|---|---|---|---|---|---|---|---|---|
| | | | | | | | COLOR | | | | | |
| | $HSCH_2CH_2OCC_{17}H_{35}$ (O=) | 0.10 | | | | | | | | | | |
| 4 | Mixture of equal wt. proportions of mono-organotin Cmpd. No. 1 from Table I and diorganotin Cmpd. D from Table VI | 0.30 | 9+ | 9 | 8 | 7 | 7 | 5 | 4 | 3 | 2 | 0 |
| | $HSCH_2CH_2CH_2OCC_8H_{17}$ (O=) | 0.03 | | | | | | | | | | |

EXAMPLES 5–7

The stabilizer compositions indicated in Table B below are tested in the same manner and with substantially equivalent results as the stabilizer compositions of Examples 1–4.

TABLE B

| Example No. | Stabilizer Composition | Parts By Weight |
|---|---|---|
| 5 | Mono-organotin Cmpd. No. 10 from Table III | 0.50 |
| | $HSCH_2CH_2OC(CH_2)_4COCH_2CH_2SH$ | 0.30 |
| 6a | Mixture of equal wt. proportions of mono-organotin Cmpd. No. 1 from Table I and diorganotin Cmpd. D from Table VI | 0.30 |
| | $HSCH_2CH_2CH_2OCC_8H_{17}$ | 0.10 |
| 6b | Mixture of equal wt. proportions of mono-organotin Cmpd. No. 1 from Table I and diorganotin Cmpd. D from Table VI | 0.30 |
| | $HSCH_2CH_2OH$ | 0.10 |
| 6c | Mixture of equal wt. proportions of mono-organotin Cmpd. No. 1 from Table I and diorganotin Cmpd. D from Table VI | 0.30 |
| | $HSCH_2COOH$ | 0.05 |
| 7 | Mono-organotin Cmpd. No. 5 from Table I | 0.40 |
| | $HSCH_2CH_2COC_8H_{17}$ | 0.15 |

Other features, advantages and specific embodiments of this invention will become readily apparent to those exercising ordinary skill in the art after reading the foregoing disclosures. These specific embodiments are within the scope of the claimed subject matter unless otherwise expressly indicated to the contrary. Moreover, while a few specific embodiments of this invention have been described in considerable detail, variations and modifications of these embodiments can be effected without departing from the spirit and scope of the invention as disclosed and claimed.

What we claim and desire to protect by Letters Patent is:

1. A composition capable of stabilizing halogen-containing organic polymers against the deterioration effects of heat, said composition consisting essentially of the product produced by blending:

A. a mono-organotin compound or mixture of mono-organotin compounds selected from compounds having the formulas:

  (II)

  (III)

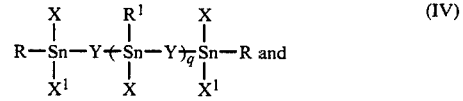  (IV)

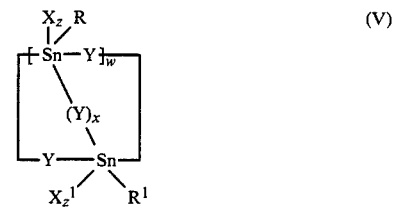  (V)

wherein
X and $X^1$ are the same or different and are selected from $-SR^2$,

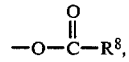

and $O-R^8$ with the proviso that in formula (V) when $z=1$ and in formulas (III) and (IV) at least one X or $X^1$ is $-SR^2$;

Y is

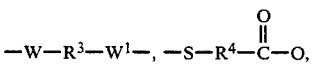

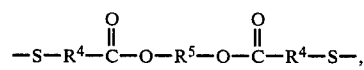

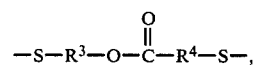

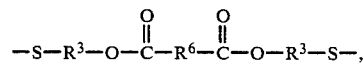

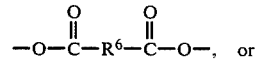  or

-continued

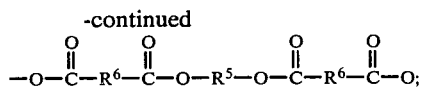

W and W¹ are the same or different and are oxygen or sulfur;

R and R¹ are the same or different and are selected from alkyl, aryl, alkenyl, aralkyl, alkaryl, cycloalkyl, cycloalkenyl,

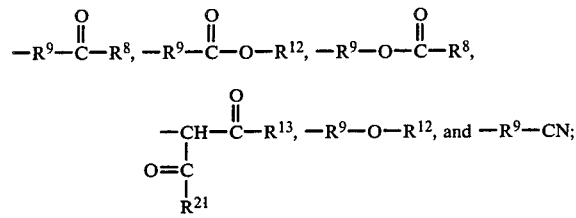

$R^2$ is alkyl, alkenyl, aryl cycloalkyl, cycloalkenyl,

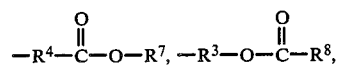

$$-R^4-O-\overset{O}{\overset{\|}{C}}-R^4-\overset{O}{\overset{\|}{C}}-O-R^8, -R^4-\overset{O}{\overset{\|}{C}}-O-R^3-O-\overset{O}{\overset{\|}{C}}-R^8,$$

$-R^3-S-R^7$, or $-R^3-O-R^8$;

$R^3$ is alkylene of at least 2 carbon atoms, arylene, alkenylene of at least 2 carbon atoms, cycloalkylene, or cycloalkenylene;

$R^4$ is alkylene, arylene, alkenylene of at least 2 carbon atoms, cycloalkylene, or cycloalkenylene;

$R^5$ is $R^3$;

$R^6$ is nothing or $R^4$;

$R^7$ is —H or $R^8$;

$R^8$ is alkyl, alkenyl, aryl, aralkyl, alkaryl, cycloalkyl, or cycloalkenyl;

$R^9$ is $C_1$ to $C_4$ alkylene;

$R^{12}$ is —H or a monovalent $C_1$ to $C_{20}$ hydrocarbon radical;

$R^{13}$ and $R^{21}$ are the same or different and are each $C_1$ to $C_{20}$ alkyl or $C_1$ to $C_{20}$ alkoxy;

q=0 or an integer from 1 to 4 inclusive;

v=an integer from 1 to 8 inclusive; and w=0, 1 or 2, x=0 or 1, z=0 or 1 with the proviso that when x=0 then z=1, when x=1 then z=0 and w=1, when w=2 then x=0 and z=1, and when w=0 then x=0, z=1 and Y is $-W-R^3-W^1-$ or

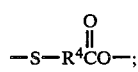

and

B. in a synergistically effective amount, a mercaptan-containing organic compound or mixture or mercaptan-containing organic compounds selected from compounds having the formula:

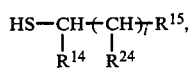

-continued

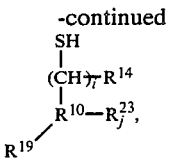

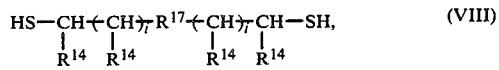

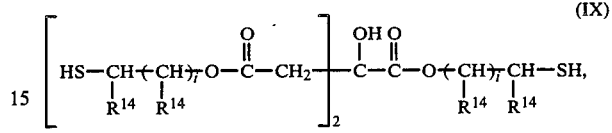

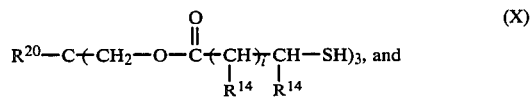

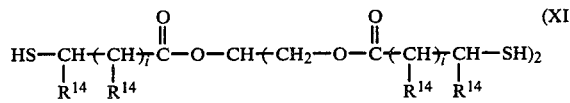

where $R^{10}$ is cycloalkyl, cycloalkenyl or phenyl;

$R^{14}$ is —H, aryl, or $C_1$ to $C_{18}$ alkyl;

$R^{15}$ and $R^{24}$ are the same or different and are

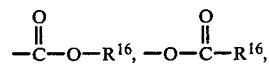

—OH, —SH, aryl, $C_1$ to $C_{18}$ alkyl, or —H;

$R^{16}$ is —H or $R^8$;

$R^{17}$ is

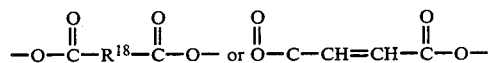

$R^{18}$ is arylene, $C_1$ to $C_8$ alkylene, or

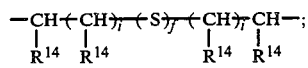

$R^{19}$ is —H or when $R^{10}$ is phenyl may be a divalent group which may contain halogen, hydroxy, mercapto or alkyl substituents and which combines with the phenyl to form a napthalene ring $R^{20}$ is —CH₃, —CH₂CH₃, or

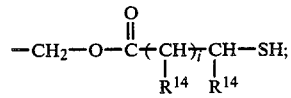

$R^{23}$ is

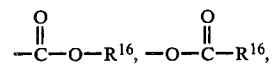

—SH, aryl, $C_1$ to $C_{18}$ alkyl, —OH or —H with the proviso that in formula (VII) when $R^{10}$ is phenyl, $R^{23}$ is —OH and i=0, then the —OH and —SH groups are on non-adjacent carbon atoms;
i=0 or an integer from 1 to 6 inclusive;
j=0, 1, 2 or 3; and
f=1 or 2; and C. in a synergistically effective amount, a diorganotin compound or mixture of diorganotin compounds selected from compounds having the formulas:

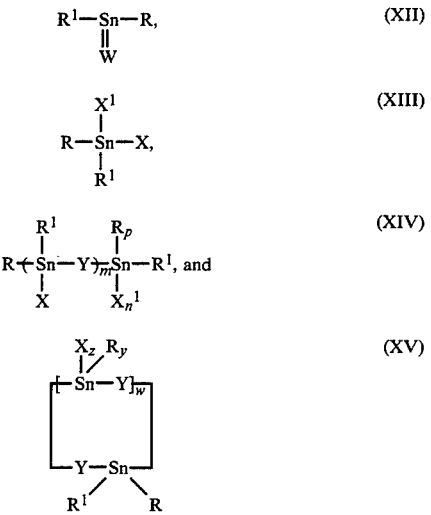

wherein

R, $R^1$, W, X, $X^1$, Y, w and z are as previously defined; n=0, 1 or 2, p=0, 1 or 2 with the proviso that n+p=2, and m=1 to 5;

y=1 or 2, y+z=2 with the proviso that when w=0 then Y is —W—$R^3$—$W^1$—, or

and in formula (XV) when z=1 and in formulas (XIII) and (XIV) at least one X or $X^1$ is —$SR^2$.

2. The stabilizer composition of claim 1 wherein the mono-organotin compound or mixture of mono-organotin compounds is according to formula (II).

3. The stabilizer composition of claim 1 wherein the mono-organotin compound mixture of mono-organotin compounds is according to formula (III).

4. The stabilizer composition of claim 1 wherein the mono-organotin compound or mixture of mono-organotin compounds is according to formula (IV).

5. The stabilizer composition of claim 1 wherein the mono-organotin compound or mixture of mono-organotin compounds is according to formula (V).

6. The stabilizer composition of claim 1 wherein the mercaptan-containing organic compound or mixture of mercaptan-containing organic compounds is according to formula (VI).

7. The stabilizer composition of claim 1 wherein the mercaptan-containing organic compound or mixture of mercaptan-containing organic compounds is according to formula (VII).

8. The stabilizer composition of claim 1 wherein the mercaptan-containing organic compound or mixture of mercaptan-containing organic compounds is according to formula (VIII).

9. The stabilizer composition of claim 1 wherein the mercaptan-containing organic compound or mixture of mercaptan-containing organic compounds is according to formula (IX).

10. The stabilizer composition of claim 1 wherein the mercaptan-containing organic compound or mixture of mercaptan-containing organic compounds is according to formula (X).

11. The stabilizer composition of claim 1 wherein the mercaptan-containing organic compound or mixture of mercaptan-containing organic compounds is according to formula (XI).

12. The stabilizer composition of claim 1 wherein the diorganotin compound or mixture of diorganotin compounds is according to formula (XII).

13. The stabilizer composition of claim 1 wherein the diorganotin compound or mixture of diorganotin compounds is according to formula (XIII).

14. The stabilizer composition of claim 1 wherein the diorganotin compound or mixture of diorganotin compounds is according to formula (XIV).

15. The stabilizer composition of claim 1 where the diorganotin compound or mixture of diorganotin compounds is according to formula (XV).

16. The stabilizer composition of claim 2 wherein the formula (II) $R^1$ is methyl or butyl, W is sulfur, and X is —$SR^2$ where $R^2$ is

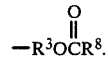

17. The stabilizer composition of claim 3 wherein in formula (III) R is methyl or butyl and X is —$SR^2$ where

18. The stabilizer composition of claim 4 wherein in formula (IV) R is methyl, X is —$SR^2$ where $R^2$ is

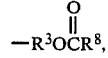

$R^1$ is methyl, $X^1$ is —$SR^2$ where $R^2$ is

Y is —S— and q=0.

19. The stabilizer composition of claim 5 wherein in formula (V) R is methyl, X is —$SR^2$ where $R^2$ is

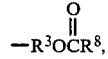

$R^1$ is methyl, $X^1$ is —$SR^2$ where $R^2$ is

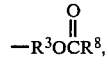

Y is —S—, w=2, x=0 and z=1.

20. The stabilizer composition of claim 6 wherein in formula (VI) $R^{14}$ is —H, $R^{24}$ is —H, $R^{15}$ is

and i=1.

21. The stabilizer composition of claim 7 wherein in formula (VII) $R^{10}$ is phenyl, $R^{14}$ is —H, $R^{23}$ is —H, $R^{19}$ is —H, i=1 and j=1.

22. The stabilizer composition of claim 8 wherein in formula (VIII) $R^{14}$ is —H, $R^{17}$ is

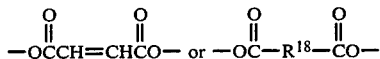

and i=1.

23. The stabilizer composition of claim 9 wherein the formula (IX) $R^{14}$ is —H and i=1.

24. The stabilizer composition of claim 10 wherein in formula (X) $R^{20}$ is —$C_2H_5$ or

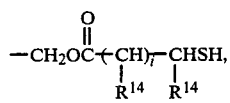

$R^{14}$ is —H and i=1.

25. The stabilizer composition of claim 11 wherein in formula (XI) $R^{14}$ is —H and i=1.

26. The stabilizer composition of claim 12 wherein in formula (XII) R is methyl or butyl, $R^1$ is methyl or butyl, and W is sulfur.

27. The stabilizer composition of claim 13 wherein in formula (XIII) R is methyl or butyl, $R^1$ is methyl or butyl, X is —$SR^2$ where $R^2$ is

and $X^1$ is —$SR^2$ where $R^2$ is

28. The stabilizer composition of claim 14 wherein in formula (XIV) R is methyl or butyl, $R^1$ is methyl or butyl, Y is —S—, X is —$SR^2$ where $R^2$ is

$X^1$ is —$SR^2$ where $R^2$ is

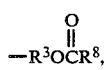

m=1, n=2 and p=0.

29. The stabilizer composition of claim 15 wherein in formula (XV) R is methyl or butyl, $R^1$ is methyl or butyl, X is —$SR^2$ where $R^2$ is

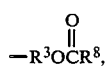

Y is —S—, w=2, y=1 and z=1.

30. The stabilizer composition of claim 1 wherein the mono-organotin compound or mixture of mono-organotin compounds is acccording to formulas II, III, IV or V where X and $X^1$ are —$SR^2$; the mercaptan-containing organic compound or mixture of mercaptan-containing organic compounds is according to formula VI where $R^{24}$ is —H, $R^{15}$ is

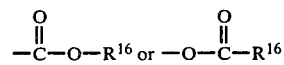

and $R^{16}$ is $R^8$; and the diorganotin compound or mixture of diorganotin compounds is according to formula XIII, XIV or XV where X and $X^1$ are —$SR^2$.

31. The stabilizer composition of claim 30 wherein $R^2$ in formulas II, III, IV, V, XIII, XIV and XV is

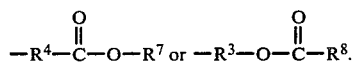

32. The stabilizer composition of claim 31 wherein $R^2$ is

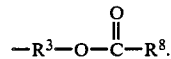

33. The stabilizer composition of claim 30 wherein $R^{15}$ in formula VI is

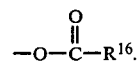

34. The stabilizer composition of claim 31 wherein $R^{15}$ in formula VI is

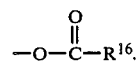

35. The stabilizer composition of claim 32 wherein $R^{15}$ in formula VI is

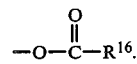

36. The stabilizer composition of claim 30 wherein the mercaptan-containing organic compound is 2-mercaptoethyl oleate.

37. The stabilizer composition of claim 1 wherein the mercaptan-containing organic compound or mixture of mercaptan-containing organic compounds is a mixture of 2-mercaptoethyl oleate and 2-mercaptoethanol.

38. The stabilizer composition of claim 1 wherein said stabilizer composition consists essentially of from about 10% by weight to about 60% by weight based on the total weight of the stabilizer composition of mercaptan-containing organic compound or mixture of mercaptan-containing organic compounds, from about 0.5% to about 75% by weight based on the total weight of the stabilizer composition of diorganotin compound or mixture of diorganotin compounds, the balance essentially mono-organotin compound or mixture of mono-organotin compounds.

39. The stabilizer composition of claim 38 wherein the diorganotin compound or mixture of diorganotin compounds comprises from about 0.05% to about 35% by weight of the total weight of the stabilizer composition.

40. The stabilizer composition of claim 38 wherein the mercaptan-containing organic compound or mixture of mercaptan-containing organic compounds comprises from about 20% to about 40% by weight of the total weight of the stabilizer composition.

41. A polymer composition comprising a halogen-containing organic polymer and a stabilizingly effective amount of a stabilizer composition according to claim 1.

42. A pipe comprising a halogen-containing organic polymer and a stabilizingly effective amount of a stabilizer composition according to claim 1.

43. The stabilizer composition of claim 1 wherein the mercaptan containing organic compound is a mixture of compounds according to formula (VI) where $R^{14}$ is —H, $R^{24}$ is —H, $R^{15}$ is

and i=1 and compounds according to formula VI where $R^{14}$ is —H, $R^{24}$ is —H, and $R^{15}$ is —OH.

44. The stabilizer composition of claim 43 wherein the monoorganotin compound or mixture of monoorganotin compounds is according to formula II, III, IV or V where X and $X^1$ are —$SR^2$ where $R^2$ is

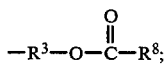

and the diorganotin compound or mixture of diorganotin compounds is according to formulas XIII, XIV or XV and X and $X^1$ are —$SR^2$ where $R^2$ is

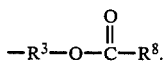

45. The stabilizer composition of claim 1 wherein essentially all of component A is
a mono-organotin compound or mixture of mono-organotin compounds selected from compounds having the formulas:

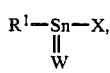 (II)

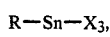 (III)

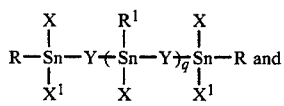 (IV)

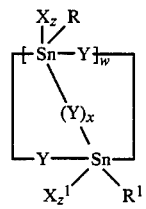 (V)

wherein
X and $X^1$ are the same or different and are selected from —$SR^2$,

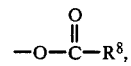

and O—$R^8$ with the proviso that in formula (V) when z=1 and in formulas (III) and (IV) at least one X or $X^1$ is —$SR^2$;

Y is

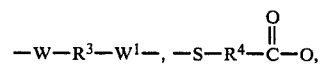

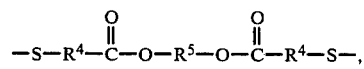

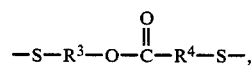

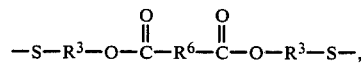

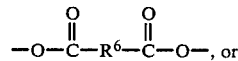

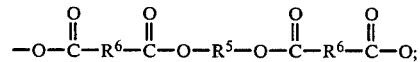

W and $W^1$ is oxygen;
R and $R^1$ are the same or different and are selected from alkyl, aryl, alkenyl, aralkyl, alkaryl, cycloalkyl, cycloalkenyl,

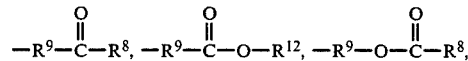

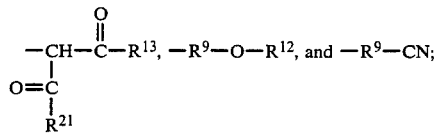

$R^2$ is alkyl, alkenyl, aryl cycloalkyl, cycloalkenyl

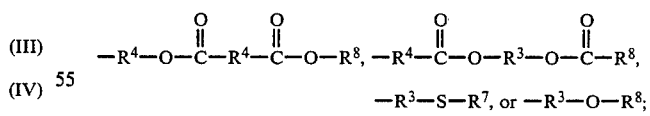

$-R^3-S-R^7$, or $-R^3-O-R^8$;

$R^3$ is alkylene of at least 2 carbon atoms, arylene, alkenylene of at least 2 carbon atoms, cycloalkylene, or cycloalkenylene;
$R^4$ is alkylene, arylene, alkenylene of at least 2 carbon atoms, cycloalkylene, or cycloalkenylene;
$R^5$ is $R^3$;
$R^6$ is nothing or $R^4$;
$R^7$ is —H or $R^8$;
$R^8$ is alkyl, alkenyl, aryl, aralkyl, alkaryl, cycloalkyl, or cycloalkenyl;
$R^9$ is $C_1$ or $C_4$ alkylene;

$R^{12}$ is —H or a monovalent $C_1$ to $C_{20}$ hydrocarbon radical;

$R^{13}$ and $R^{21}$ are the same or different and are each $C_1$ to $C_{20}$ alkyl or $C_1$ to $C_{20}$ alkoxy;

q=0 or an integer from 1 to 4 inclusive;

v=an integer from 1 to 8 inclusive; and w=0, 1 or 2, x=0 or 1, z=0 or 1 with the proviso that when x=0 then z=1, when x=1 then z=0 and w=1, when w=2 then x=0 and z=1, and when w=0 then x=0, z=1 and Y is —W—$R^3$—$W^1$— or

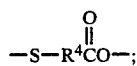

and essentially all of component C is a diorganotin compound or mixture of diorganotin compounds selected from compounds having the formulas:

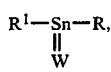 (XII)

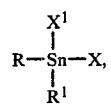 (XIII)

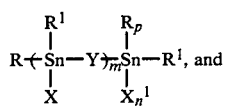 (XIV)

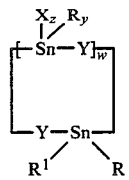 (XV)

wherein

R, $R^1$, W, X, $X^1$, y, w and z are as previously defined;

n=0, 1 or 2, p=0, 1 or 2 with the proviso that n+p=2, and m=1 to 5;

y=1 or 2, y+z=2 with the proviso that when w=0 then Y is —W—$R^3$—$W^1$—, or

and in formula (XV) when z=1 and in formulas (XIII) and (XIV) at least one X or $X^1$ is —$SR^2$.

46. The stabilizer composition of claim 45 wherein component A is a monoorganotin compound or mixture of monoorganotin compounds according to formula (III) where X is $SR^2$ and $R^2$ is

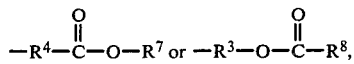

and component C is a diorganotin compound or mixture of diorganotin compounds according to formula (XIII) where X and $X^1$ are —$SR^2$ where $R^2$ is

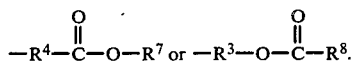

47. The stabilizer composition of claim 46 wherein $R^2$ in formulas (III) and (XIII) is

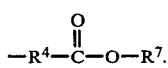

48. The stabilizer composition of claim 46 wherein $R^2$ in formulas (III) and (XIII) is

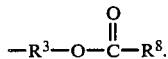

49. The stabilizer composition of claim 45, 46, 47, or 48 wherein the component B mercaptan-containing organic compound or mixture of mercaptan-containing compounds is according to formula (VI) where $R^{24}$ is —H, $R^{15}$ is

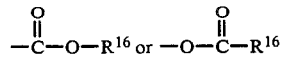

and $R^{16}$ is $R^8$.

50. The stabilizer composition of claim 49 wherein $R^{15}$ is

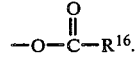

51. The stabilizer composition of claim 49 wherein component B is selected from the group consisting of 2-mercaptoethanol. lauryl mercaptide, 2-mercaptoethyl oleate, 2-mercaptoethyl stearate, isooctyl thioglycolate and mixtures thereof.

52. The stabilizer composition of claim 49 wherein component B is a mixture of 2-mercaptoethanol and 2-mercaptoethyl oleate.

53. The stabilizer composition of claim 49 wherein component B is 2-mercaptoethyl oleate.

* * * * *

REEXAMINATION CERTIFICATE (1704th)

United States Patent [19]

Bresser et al.

[11] B1 4,701,486

[45] Certificate Issued May 19, 1992

[54] STABILIZER COMPOSITIONS FOR PVC RESINS

[75] Inventors: Robert E. Bresser, Sharonville; Karl R. Wursthorn, Cincinnati, both of Ohio

[73] Assignee: Thiokol Corporation

Reexamination Request:
No. 90/002,342, May 8, 1991

Reexamination Certificate for:
Patent No.: 4,701,486
Issued: Oct. 20, 1987
Appl. No.: 568,532
Filed: Jan. 5, 1984

Reexamination Certificate B0 4,701,486 issued May 19, 1992.

Related U.S. Application Data

[63] Continuation of Ser. No. 382,822, May 27, 1982, abandoned, which is a continuation of Ser. No. 238,298, Feb. 26, 1981, abandoned.

[51] Int. Cl.$^5$ .................................................. C08K 5/58
[52] U.S. Cl. .................................... 524/182; 252/400.1; 524/180; 524/181; 524/306; 524/311; 524/312; 524/314

[58] Field of Search .............. 524/180, 181, 182, 304, 524/303, 330, 333; 252/400 R, 400.1

[56] References Cited

U.S. PATENT DOCUMENTS

| | | | |
|---|---|---|---|
| 3,544,510 | 12/1970 | Stapfer | 260/45.75 |
| 4,043,957 | 8/1977 | Szabo | 260/23 |
| 4,611,101 | 9/1986 | Müller | 521/89 |

FOREIGN PATENT DOCUMENTS

45-35174 11/1970 Japan .
1565465 4/1977 United Kingdom .

OTHER PUBLICATIONS

Joseph W. Burley et al: *Polymer Degradation and Stability* 3 (1980–81) 285–294.
Richard G. Parker et al: *Stabilization and Degradation of Polymers*, American Chem. Society, 363–373 (1978).

*Primary Examiner*—Veronica P. Hoke

[57] ABSTRACT

Compositions which are effective in stabilizing polymers against the deteriorative effects of heat are provided comprising (1) a mono-organotin compound or mixture of mono-organotin compounds, (2) a mercaptan-containing organic compound or mixture of mercaptan-containing organic compounds, and, optionally (3) a diorganotin compound or mixture of diorganotin compounds. Also provided are polymer compositions containing said stabilizers and articles of manufacture made from said stabilized polymer compositions.

REEXAMINATION CERTIFICATE ISSUED UNDER 35 U.S.C. 307

THE PATENT IS HEREBY AMENDED AS INDICATED BELOW.

Matter enclosed in heavy brackets [] appeared in the patent, but has been deleted and is no longer a part of the patent; matter printed in italics indicates additions made to the patent.

AS A RESULT OF REEXAMINATION IT HAS BEEN DETERMINED THAT:

Claims 1, 44, 45, 49 and 51 are determined to be patentable as amended.

Claims 2-43, 46-48, 50, 52 and 53, dependent on an amended claim, are determined to be patentable.

New claims 54-60 are added and determined to be patentable.

44. [The stabilizer composition of claim 43 wherein the monoorganotin compound or mixture of monoorganotin compounds formulas:
wherein according to formula II, III, IV of V where X and $X^1$ are $-SR^2$ where $R^2$ is] *A composition capable of stabilizing halogen-containing organic polymers against the deterioration effects of heat, said composition consisting essentially of the product produced by blending:*

*A. a mono-organotin compound or mixture of mono-organotin compounds selected from compounds having the formulas:*

$$R^1-Sn-X, \quad (II)$$
$$\overset{\|}{W}$$

$$R-Sn-X_3, \quad (III)$$

$$\underset{X^1}{\overset{X}{\underset{|}{R-Sn}}}-Y + \underset{X}{\overset{R^1}{\underset{|}{Sn}}}-Y_{\overline{q}} \underset{X^1}{\overset{X}{\underset{|}{Sn}}}-R \text{ and} \quad (IV)$$

$$\begin{array}{c} X_z \quad R \\ \diagdown / \\ + Sn-Y]_w \\ \diagdown \\ (Y)_x \\ \diagdown \\ Y-Sn \\ / \diagdown \\ X_z^1 \quad R^1 \end{array} \quad (V)$$

*X and $X^1$ are $-SR^2$,*
*Y is*

$$+S+_v, \quad -W-R^3-W^1-, \quad -S-R^4-\overset{O}{\overset{\|}{C}}-O,$$

$$-S-R^4-\overset{O}{\overset{\|}{C}}-O-R^5-O-\overset{O}{\overset{\|}{C}}-R^4-S-,$$

$$-S-R^3-O-\overset{O}{\overset{\|}{C}}-R^4-S-,$$

-continued $$-S-R^3-O-\overset{O}{\overset{\|}{C}}-R^6-\overset{O}{\overset{\|}{C}}-O-R^3-S-.$$

$$-O-\overset{O}{\overset{\|}{C}}-R^6-\overset{O}{\overset{\|}{C}}-O-, \text{ or}$$

$$-O-\overset{O}{\overset{\|}{C}}-R^6-\overset{O}{\overset{\|}{C}}-O-R^5-O-\overset{O}{\overset{\|}{C}}-R^6-\overset{O}{\overset{\|}{C}}-O;$$

*W and $W^1$ are the same or different and are oxygen or sulfur;*
*R and $R^1$ are the same or different and are selected from alkyl, aryl, alkenyl, aralkyl, alkaryl, cycloalkyl, cycloalkenyl,*

$$-R^9-\overset{O}{\overset{\|}{C}}-R^8, \quad -R^9-\overset{O}{\overset{\|}{C}}-O-R^{12}, \quad -R^9-O-\overset{O}{\overset{\|}{C}}-R^8,$$

$$-\underset{\underset{R^{21}}{\overset{|}{C}}}{\overset{|}{\underset{O=C}{CH}}}-\overset{O}{\overset{\|}{C}}-R^{13}, \quad -R^9-O-R^{12}, \text{ and } -R^9-CN;$$

*$R^2$ is*

$$-R^3-O-\overset{O}{\overset{\|}{C}}-R^8,$$

*$R^3$ is alkylene of at least 2 carbon atoms, arylene, alkenylene of at least 2 carbon atoms, cycloalkylene, or cycloalkenylene;*
*$R^4$ is alkylene, arylene, alkenylene of at least 2 carbon atoms, cycloalkylene, or cycloalkenylene;*
*$R^5$ is $R^3$;*
*$R^6$ is nothing or $R^4$;* [$R^7$ is $-H$ or $R^8$,] *$R^8$ is alkyl, alkenyl, aryl, aralkyl, alkaryl, cycloalkyl, or cycloalkenyl;*
*$R^9$ is $C_1$ to $C_4$ alkylene;*
*$R^{12}$ is $-H$ or a monovalent $C_1$ to $C_{20}$ hydrocarbon radical;*
*$R^{13}$ and $R^{21}$ are the same or different and are each $C_1$ to $C_{20}$ alkyl or $C_1$ to $C_{20}$ alkoxy;*
*$q=0$ or an integer from 1 to 4 inclusive;*
*$v=$ an integer from 1 to 8 inclusvie; and,*
*$w=0$, 1 or 2, $x=0$ or 1, $z=0$ or 1 with the proviso that when $x=0$ then $z=1$, when $x=1$ then $z=0$ and $w=1$, when $w=2$ then $x=0$ and $z=1$, and when $w=0$ then $x=0$, $z=1$ and Y is $-W-R^3-W^1-$ or*

$$-S-R^4\overset{O}{\overset{\|}{C}}O-;$$

*B. In a synergistically effective amount, a mixture of mercaptan-containing organic compounds having the formulas:*

$$-O\overset{O}{\overset{\|}{C}}-R^{16}$$

*and*
*C. in a synergistically effective amount, a diorganotin compound or mixture of diorganotin compounds selected from compounds having the formulas:*

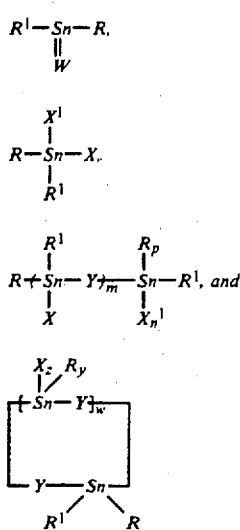

(XII)

(XIII)

(XIV)

(XV)

wherein
R, R¹, W, X, X¹, Y, w and z are as previously defined;
n=0, 1 or 2, p=0, 1 or 2 with the proviso that n+p=2, and m=1 to 5;
y=1 or 2, y+z=2 with the proviso that when w=0 then Y is —W—R³—W¹—, or

45. The stabilizer composition of claim 1 wherein essentially all of component A is a mono-organoti compound of mixture of mono-organotin compounds selected from compounds having the formulas:

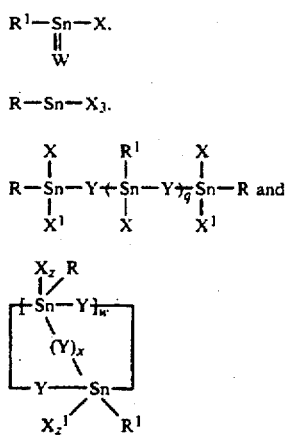

wherein
X and X¹ are the same or different and are selected from —SR²,

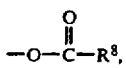

and O—R⁸ with the proviso that in formula (V) when z=1 and in formulas (III) and (IV) at least one X or X¹ is —SR;

Y is

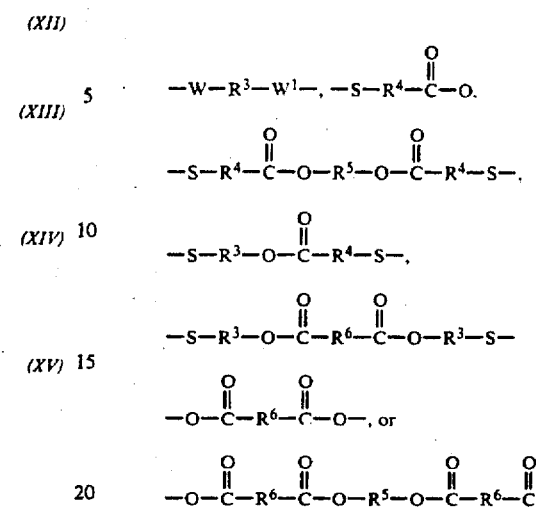

W and W¹ is oxygen;
R and R¹ are the same or different and are selected from alkyl, aryl, alkenyl, aralkyl, alkaryl, cycloalkyl, cycloalkenyl,

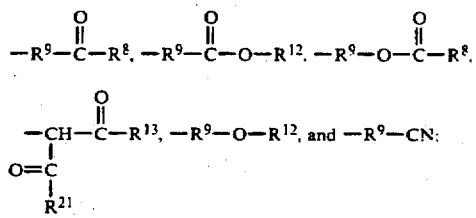

R² is [alkyl, alkenyl, aryl cycloalkyl, cycloalkenyl]

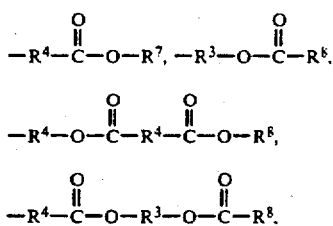

[—R³—S—R⁷, or —R³—O—R⁸;]

R³ is alkylene of at least 2 carbon atoms, arylene, alkenylene of at least 2 carbon atoms, cycloalkylene, or cycloalkenylene;
R⁴ is alkylene, arylene, alkenylene or at least 2 carbon atoms, cycloalkylene, or cycloalkenylene;
R⁵ is R³;
R⁶ is nothing or R⁴;
R⁷ is —H or R⁸;
R⁸ is alkyl, alkenyl, aryl, aralkyl, alkaryl, cycloalkyl, or cycloalkenyl;
R⁹ is $C_1$ to $C_4$ alkylene;
R¹² is —H or a monovalent $C_1$ to $C_{20}$ hydrocarbon radical;
R¹³ and R²¹ are the same or different and are each $C_1$ to $C_{20}$ alkyl or $C_1$ to $C_{20}$ alkoxy;
q=0 or an integer from 1 to 4 inclusive;
v=an integer from 1 to 8 inclusive; and $w=0$, 1 or 2, $x=0$ or 1, $z=0$ or 1 with the proviso that when $x=0$ then $z=1$, when $x=1$ then $z=0$ and $w=1$, when $w=2$ then $x=0$ and $z=1$, and when $w=0$ then $x=0$, $z=1$ and Y is $-W-R^3-W^1-$ or

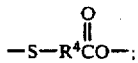

and essentially all of component C is
a diorganotin compound or mixture of diorganotin compounds selected from compounds having the formulas:

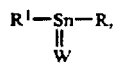  (XII)

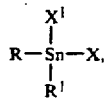  (XIII)

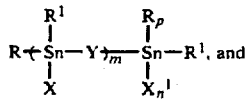  (XIV)

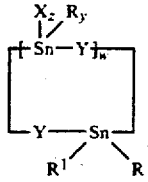  (XV)

wherein
R, $R^1$, W, X, $X^1$, y, w and z are as previously defined; $n=0$, 1 or 2, $p=0$, 1 or 2 with the proviso that $n+p=2$, and $m=1$ to 5; $y=1$ or 2, $y+z=2$ with the proviso that when $w=0$ then Y is $-W-R^3-W^1-$, or

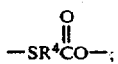

and in formula (XV) when $z=1$ and in formulas (XIII) and (XIV) at least one X or $X^1$ is $-SR^2$.

49. The stabilizer composition of claims 45, 46, [or 48] or 47, wherein the component B mercaptan-containing organic compound or mixture of mercaptan-containing compounds is according to formula (VI) where $R^{24}$ is $-H$, $R^{15}$ is

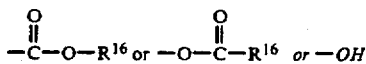

and $R^{16}$ is $R^8$.

51. The stabilizer composition of claim 49 wherein component B is selected from the group consisting of 2-mercaptoethanol [lauryl mercaptide] 2-mercaptoethyl oleate, 2-mercaptoethyl stearate, isooctyl thioglycolate and mixtures thereof.

54. A composition capable of stabilizing halogen-containing organic polymers against the deterioration effects of heat, said composition consisting essentially of the product produced by blending:

A. a mono-organotin compound or mixture of mono-organotin compounds, essentially all of which are selected from compounds having the formula:

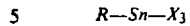  (III)

where X is $SR^2$ and $R^2$ is

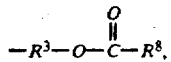

$R^3$ is alkylene of at leat 2 carbon atoms, arylene, alkenylene of at least 2 carbon atoms, cycloalkylene, or cycloalkenylene;
$R^8$ is alkyl, alkenyl, aryl, aralkyl, alkaryl, cycloalkyl, or cycloalkenyl;
R is selected from alkyl, aryl, alkenyl, aralkyl, alkaryl, cycloalkyl, cycloalkenyl,

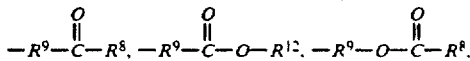

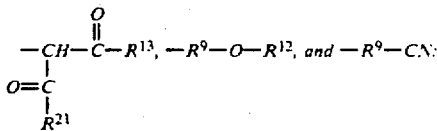

$R^9$ is $C_1$ to $C_4$ alkylene;
$R^{12}$ is $-H$ or a monovalent $C_1$ to $C_{20}$ hydrocarbon radical;
$R^{13}$ and $R^{21}$ are the same or different and are each $C_1$ to $C_{20}$ alkyl or $C_1$ to $C_{20}$ alkoxy;

B. a mercaptan-containing organic compound or mixture of mercaptan-containing compounds is according to the formula:

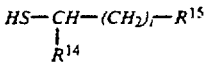  (VI)

where $R^{14}$ is $-H$, aryl or $C_1$ to $C_{18}$ alkyl, and $R^{15}$ is

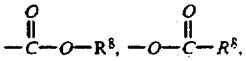

or $-OH$,
i is 0 or an integer from 1 to 6; and

C. in a synergistically effective amount, a diorganotin compound or mixture of diorganotin compounds, essentially all of which are selected from compounds having the formula:

  (XIII)

wherein R is as previously defined, $R^1$ is the same or different from R and is defined as R is previously defined, X is as previously defined, and $X^1$ is the same or different from X and is defined as X is previously defined.

55. The stabilizer composition of claim 54 wherein $R^{15}$ is

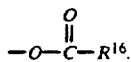

56. The stabilizer composition of claim 54 wherein component B is selected from the group consisting of 2-mercaptoethanol, 2-mercaptoethyl oleate, 2-mercaptoethyl stearate, isoocytyl thioglycolate and mixtures thereof.

57. The stabilizer composition of claim 54 wherein component B is a mixture of 2-mercaptoethanol and 2-mercaptoethyl oleate.

58. The stabilizer composition of claim 54 wherein component B is 2-mercaptoethyl oleate.

59. The stabilizer composition of claim 44 wherein component B is a mixture of 2-mercaptoethanol and 2-mercaptoethyl oleate.

60. The stabilizer composition of claim 44 wherein component B is 2-mercaptoethyl oleate.

* * * * *